United States Patent
Mack et al.

(10) Patent No.: US 11,292,956 B2
(45) Date of Patent: Apr. 5, 2022

(54) STABILIZATION AND REDUCTION OF TCT OF DIVALENT IODIDE-CONTAINING BRINES

(71) Applicant: TETRA Technologies, Inc., Conroe, TX (US)

(72) Inventors: Arthur G. Mack, Conroe, TX (US); Drew A. Fowler, Humble, TX (US)

(73) Assignee: TETRA TECHNOLOGIES, INC., Conroe, TX (US)

( * ) Notice: Subject to any disclaimer, the term of this patent is extended or adjusted under 35 U.S.C. 154(b) by 0 days.

(21) Appl. No.: 17/236,103

(22) Filed: Apr. 21, 2021

(65) Prior Publication Data

US 2021/0238468 A1    Aug. 5, 2021

Related U.S. Application Data

(62) Division of application No. 15/791,748, filed on Oct. 24, 2017, now Pat. No. 11,021,645.

(51) Int. Cl.
| | |
|---|---|
| C09K 8/42 | (2006.01) |
| C09K 8/06 | (2006.01) |
| E21B 36/00 | (2006.01) |
| C09K 8/528 | (2006.01) |
| C09K 8/03 | (2006.01) |

(52) U.S. Cl.
CPC .............. *C09K 8/528* (2013.01); *C09K 8/032* (2013.01); *C09K 8/06* (2013.01); *C09K 8/42* (2013.01); *E21B 36/00* (2013.01)

(58) Field of Classification Search
None
See application file for complete search history.

(56) References Cited

U.S. PATENT DOCUMENTS

| | | | |
|---|---|---|---|
| 1,911,195 | A | 5/1933 | Kepfer |
| 2,191,312 | A | 2/1940 | Cannon |
| 2,898,294 | A | 8/1959 | Priest et al. |
| 3,275,552 | A | 9/1966 | Kern et al. |
| 4,292,183 | A | 9/1981 | Sanders |
| 4,444,668 | A | 4/1984 | Walker et al. |
| 4,465,601 | A | 8/1984 | Pasztor, Jr. |
| 4,486,340 | A | 12/1984 | Glass, Jr. |
| 4,566,976 | A | 1/1986 | House et al. |
| 5,076,364 | A | 12/1991 | Hale et al. |
| 5,330,683 | A | 7/1994 | Sufrin |
| 5,415,230 | A | 5/1995 | Fisk, Jr. et al. |
| 5,728,652 | A | 3/1998 | Dobson, Jr. |
| 5,846,914 | A | 12/1998 | Finkelstein et al. |
| 6,080,704 | A | 6/2000 | Halliday et al. |
| 6,100,222 | A | 8/2000 | Vollmer et al. |
| 6,124,244 | A | 9/2000 | Murphey |
| 6,489,270 | B1 | 12/2002 | Vollmer et al. |
| 6,617,285 | B2 | 9/2003 | Crews |
| 6,635,604 | B1 | 10/2003 | Halliday et al. |
| 6,730,234 | B2 | 5/2004 | Symens et al. |
| 6,843,931 | B2 | 1/2005 | Sapienza |
| 7,048,961 | B2 | 5/2006 | Knauf |
| 7,078,370 | B2 | 7/2006 | Crews |
| 7,084,093 | B2 | 8/2006 | Crews |
| 7,306,039 | B2 | 12/2007 | Wang et al. |
| 7,825,073 | B2 | 11/2010 | Welton et al. |
| 7,910,524 | B2 | 3/2011 | Welton et al. |
| 7,960,315 | B2 | 6/2011 | Welton et al. |
| 8,003,578 | B2 | 8/2011 | Monroe et al. |
| 8,030,254 | B2 | 10/2011 | Phatak et al. |
| 8,067,342 | B2 | 11/2011 | Lin et al. |
| 8,071,059 | B2 | 12/2011 | Filippi et al. |
| 8,381,537 | B2 | 2/2013 | Morita et al. |
| 8,697,611 | B2 | 4/2014 | Zhang et al. |
| 8,853,135 | B2 | 10/2014 | Phatak et al. |
| 8,936,111 | B2 | 1/2015 | Maghrabi et al. |
| 8,950,492 | B2 | 2/2015 | Maghrabi et al. |
| 9,127,192 | B2 | 9/2015 | Maghrabi et al. |
| 9,593,276 | B2 | 3/2017 | Livanec |
| 9,868,890 | B2 | 1/2018 | Alleman |
| 2003/0092581 | A1 | 5/2003 | Crews |
| 2004/0124013 | A1 | 7/2004 | Wiesner et al. |
| 2005/0038199 | A1 | 2/2005 | Wang et al. |

(Continued)

FOREIGN PATENT DOCUMENTS

| | | |
|---|---|---|
| CN | 106928930 A | 7/2017 |
| EP | 0194254 A1 | 9/1986 |

(Continued)

OTHER PUBLICATIONS

Chen, et al.; Effect of Cryoprotectants on Eutectics of NaCl 2H2O/ice and KCl/ice Studied by Temperature Wave Analysis and Differential Scanning Calorimetry; Thermochimica Acta 431 (2005) 106-112; 7 pgs.
Google English translation of WO2015068865 A1, publication date May 14, 2015, 16 pages.
International Search Report and Written Opinion for related PCT application PCT/US2018/057200 dated Dec. 14, 2018. (TETRA1005).
International Search Report and Written Opinion for related PCT application PCT/US2018/057202 dated Jan. 7, 2019.
International Search Report and Written Opinion for related PCT application PCT/US2018/057205 dated Dec. 14, 2018. (TETRA1007).
Kaminski, et al., "Clearly Different", Reprinted from Oilfield Technology, Jul. 2012, 4 pgs.
PCT/US2017/023995 International Search Report and Written Opinion dated May 24, 2017; 15 Pgs.

(Continued)

*Primary Examiner* — Charles R Nold
(74) *Attorney, Agent, or Firm* — Bracewell LLP; Constance Gall Rhebergen

(57) ABSTRACT

A composition for use in a wellbore activity, the composition comprising a stabilized divalent iodide brine, the stabilized divalent iodide brine comprises a divalent salt system, where the divalent salt system comprises a divalent iodide, an primary iodide stabilizer, the primary iodide stabilizer operable to remove free iodine, prevent the formation of free iodine, and suppress TCT, and an aqueous fluid, where the stabilized divalent iodide brine has a density greater than 11 lb/gal, where the stabilized divalent iodide brines has a TCT of less than or equal to 70 deg F.

20 Claims, No Drawings

(56) References Cited

U.S. PATENT DOCUMENTS

| | | |
|---|---|---|
| 2005/0101491 A1 | 5/2005 | Vollmer |
| 2005/0253110 A1 | 11/2005 | Chauhan et al. |
| 2008/0093579 A1 | 4/2008 | Knauf |
| 2008/0269081 A1 | 10/2008 | Lin et al. |
| 2009/0048126 A1 | 2/2009 | Phatak et al. |
| 2010/0016180 A1 | 1/2010 | Scoggins et al. |
| 2010/0093565 A1 | 4/2010 | Phatak et al. |
| 2010/0130388 A1 | 5/2010 | Phatak et al. |
| 2010/0163255 A1 | 7/2010 | Horton et al. |
| 2010/0303737 A1 | 12/2010 | Hurtig |
| 2010/0311621 A1 | 12/2010 | Kesavan et al. |
| 2012/0118569 A1 | 5/2012 | Deville |
| 2013/0098615 A1 | 4/2013 | Perez et al. |
| 2013/0168095 A1 | 7/2013 | Loveless et al. |
| 2013/0231268 A1 | 9/2013 | Ghosh et al. |
| 2014/0148366 A1 | 5/2014 | Reyes Bautista |
| 2014/0221256 A1 | 8/2014 | Holtsclaw |
| 2014/0262283 A1 | 9/2014 | Savari et al. |
| 2014/0352961 A1 | 12/2014 | Dobson, Jr. et al. |
| 2015/0096808 A1 | 4/2015 | Misino et al. |
| 2016/0177698 A1 | 6/2016 | Schultheiss et al. |
| 2016/0208158 A1 | 7/2016 | Monahan et al. |
| 2017/0088762 A1 | 3/2017 | Zhang et al. |
| 2017/0145284 A1 | 5/2017 | Davidson et al. |
| 2017/0158939 A1 | 6/2017 | Chen et al. |
| 2017/0158976 A1 | 6/2017 | O'Rear et al. |
| 2017/0190954 A1 | 7/2017 | Schultheiss et al. |
| 2017/0292055 A1 | 10/2017 | Alleman |
| 2018/0016484 A1 | 1/2018 | Ray et al. |

FOREIGN PATENT DOCUMENTS

| | | |
|---|---|---|
| EP | 2463350 A1 | 6/2012 |
| EP | 1863890 B1 | 10/2014 |
| GB | 2250761 A | 6/1992 |
| GB | 2334279 A | 8/1999 |
| JP | 56098482 A | 8/1981 |
| KR | 20040043935 A | 5/2004 |
| WO | 9821291 A1 | 5/1998 |
| WO | 03064555 A1 | 8/2003 |
| WO | 2004050557 A1 | 6/2004 |
| WO | 2009126548 A2 | 10/2009 |
| WO | 2015068865 A1 | 5/2015 |
| WO | 2016025137 A1 | 2/2016 |
| WO | 2017165754 A1 | 9/2017 |

OTHER PUBLICATIONS

PCT/US2017/023996 International Search Report and Written Opinion dated May 24, 2017; 16 Pgs.

PCT/US2017/024008 International Search Report and Written Opinion dated May 24, 2017; 16 Pgs.

Section B14 Solubility in Non-Aqueous Solvents, Formate Technical Manual, Mar. 2013, 1-4, Version 1, Cabot Specialty Fluids, 4 pgs.

Telang, et al.. Effective Inhibition of Mannitol Crystallization in Frozen Solutions by Sodium Chloride, Pharmaceutical Research (Apr. 2003), vol. 20, No. 4, 660-667, 8 pgs.

U.S. Appl. No. 15/791,748 Non-Final Office Action dated Feb. 25, 2019 (21 pages).

STABILIZATION AND REDUCTION OF TCT OF DIVALENT IODIDE-CONTAINING BRINES

CROSS-REFERENCE TO RELATED APPLICATIONS

This application is a divisional of U.S. Non-Provisional patent application Ser. No. 15/791,748 filed on Oct. 24, 2017. For purposes of United States patent practice, this application incorporates the contents of the Non-Provisional patent application by reference in its entirety.

BACKGROUND

Technical Field

Described are compositions for use in wellbore fluids in well operations. More specifically, described are fluid compositions with low crystallization temperatures and high densities for use in wellbore fluids in well operations.

Description of the Related Art

When used as a completion fluid, brines can crystallize if exposed to lower temperatures and/or higher pressures. As the density of a brine increases above the salt side of the eutectic point so does the true crystallization temperature (TCT) and pressure crystallization temperature (PCT), which can cause blockage to tubulars in a wellbore or in equipment on the surface if the fluid crystallizes. If crystallization occurs and the solid is filtered from the brine, this will lead to a decrease in fluid density and can cause wellbore stability issues or a blowout. Applying pressure to a divalent brine at a density above the eutectic point will lead to an increase in density, which in turn can lead to crystallization. Crystallization inhibitors can be used to lower the TCT and PCT, but can also result in a reduction of the density of the brine.

Calcium bromide brines can be formulated with densities up to 15.2 pounds per gallon (lb/gal). In deep water and high temperature, high pressure (HTHP) well operations densities up to 14.2 lb/gal are typically used. Zinc salts, such as zinc bromide ($ZnBr_2$) can be used to increase the density above 14.2 lb/gal while maintaining a low crystallization temperature. However, zinc is a marine pollutant and can cause issues in the processing stage if residual zinc is present in the oil sent to the refinery. Cesium formate ($CsCHO_2$) can be used to increase the density of potassium formate above 13.1 lb/gal. Cesium formate is expensive and available only in limited supply making it cost-prohibitive for wellbore operations requiring significant volumes of fluid.

SUMMARY

Described are fluid compositions for use in wellbore fluids in well operations. More specifically, described are compositions with low crystallization temperatures and high densities for use in wellbore fluids in well operations.

In a first aspect, a composition for use in a wellbore activity is provided. The composition including a stabilized divalent iodide brine. The stabilized divalent iodide brine includes a divalent salt system, where the divalent salt system includes a divalent iodide, a primary iodide stabilizer, the primary iodide stabilizer operable to remove free iodine, prevent the formation of free iodine, and suppress TCT, and aqueous fluid, where the stabilized divalent iodide brine has a density greater than 11 lb/gal, where the stabilized divalent iodide brine has a TCT of less than or equal to 70 deg F.

In certain aspects, the divalent iodide is selected from the group consisting of calcium iodide, magnesium iodide, strontium iodide, and combinations of the same. In certain aspects, the divalent iodide is present in the range between 1 wt % and 70 wt %, and further the primary iodide stabilizer is present in the range between 0.1 wt % and 35 wt % of the stabilized divalent iodide brine. In certain aspects, the divalent salt system further includes an additional halide. In certain aspects, the additional halide is selected from the group consisting of a divalent halide, a monovalent halide, and combinations of the same. In certain aspects, the additional halide includes a divalent halide selected from the group consisting of calcium bromide, calcium chloride, magnesium bromide, magnesium chloride, strontium bromide, strontium chloride, and combinations of the same. In certain aspects, the additional halide includes a monovalent halide selected from the group consisting of sodium bromide, sodium chloride, sodium iodide, potassium bromide, potassium chloride, potassium iodide, lithium bromide, lithium chloride, lithium iodide, cesium bromide, cesium chloride, cesium iodide, rubidium bromide, rubidium chloride, rubidium iodide and combinations of the same. In certain aspects, the divalent iodide is present in the range between 1 wt % and 70 wt % of the stabilized divalent iodide brine, the additional halide is present in the range between 1 wt % and 45 wt %, and the primary iodide stabilizer is present in the range between 0.1 wt % and 35 wt % of the stabilized divalent iodide brine. In certain aspects, the primary iodide stabilizer includes a low molecular weight polyol. In certain aspects, the low molecular weight polyol is selected from the group consisting of sorbitol, glycerol, xylitol, mannitol, diglycerol, polyethylene glycol with a molecular weight less than 1000 Da, and combinations of the same. In certain aspects, the stabilized divalent iodide brine further includes a secondary iodide stabilizer. In certain aspects, the secondary iodide stabilizer is selected from the group consisting of amines, amino alcohols, hydroxylamines, hydrazines, erythorbic acid and derivative erythorbate salts, ascorbic acid and derivative ascorbate salts, citric acid and derivative citrate salts, and combinations of the same. In certain aspects, the secondary iodide stabilizer is present in the range between 0.001% v/v and 5% v/v.

In a second aspect, a method of using a stabilized divalent iodide brine during a wellbore activity is provided, the method includes the steps of introducing the stabilized divalent iodide brine into a wellbore and completing the wellbore activity.

In certain aspects, the wellbore activity is selected from the group consisting of drilling, reservoir drilling, completion activities, workover activities, well intervention activities, and as a packer fluid.

In a third aspect, a method of creating a stabilized divalent iodide brine is provided. The method includes the steps of adding an amount of a divalent salt system to aqueous fluid, where the divalent salt system includes divalent iodide, and adding an amount of the primary iodide stabilizer.

In certain aspects, the method further includes the step of adding an amount of an secondary iodide stabilizer.

DETAILED DESCRIPTION

While the scope will be described with several embodiments, it is understood that one of ordinary skill in the relevant art will appreciate that many examples, variations and alterations to the apparatus and methods described herein are within the scope and spirit. Accordingly, the exemplary embodiments described herein are set forth without any loss of generality, and without imposing limitations.

The compositions and methods described here are directed to divalent iodide-containing brines for use in wellbore activities. The divalent iodide-containing brines are stabilized forming stabilized divalent iodide brines. In at least one embodiment, the stabilized divalent iodide brines are clear brines.

The use of divalent iodide in a brine is ineffective due to the divalent iodide being unstable in the presence of air or carbon dioxide. Brines can acquire carbon dioxide and oxygen (from air) as the brines are pumped or circulated. The oxygen or carbon dioxide can oxidize the iodide ion ($I^-$) to iodine ($I_2$). The presence of iodine results in a brine that is orange in color and can result in the formation of iodine crystals. The reaction of the iodide ion to iodine can produce unwanted by-products that can precipitate and have a negative impact on the properties of the brine and well operations. Divalent iodide brines in the absence of a primary iodide stabilizer can result in the degradation of the brine. The degraded brines can include halogens that can react with the wellbore and can be corrosive. Due to the instability and potential for degradation, divalent iodides are not suitable for use in commercial wellbore applications.

Advantageously, the addition of a primary iodide stabilizer results in a composition that demonstrates the ability to stabilize the divalent iodide brine by removing free iodine and protecting against further oxidation.

Advantageously, the stabilized divalent iodide brines containing both a divalent iodide and an additional halide can have densities greater than brines containing a divalent halide or monovalent halide alone. Advantageously, the stabilized divalent iodide brine compositions are more readily available, and less toxic as compared to brines containing zinc bromide. Advantageously, the stabilized divalent iodide brine compositions have high densities, increased gas hydrate suppression, stability at elevated temperatures, and reduced TCT as compared to divalent iodide brines in the absence of a primary iodide stabilizer. Advantageously, the stabilized divalent iodide brines can be formulated to have the target properties desired for the wellbore activity, such that the formulations can vary based on the density and TCT desired for a given wellbore activity or a set of wellbore and operating conditions.

As used here, "divalent iodide" refers to a compound containing an alkaline earth metal ion and an iodide ion. Examples of divalent iodides can include calcium iodide, magnesium iodide, strontium iodide, and combinations of the same.

As used here, "additional halide" refers to a divalent halide, a monovalent halide, and combinations of the same.

As used here, "divalent halide" refers to a salt compound containing an alkaline earth metal and a halide ion other than iodine. Examples of divalent halides can include calcium bromide, calcium chloride, magnesium bromide, magnesium chloride, strontium bromide, strontium chloride, and combinations of the same.

As used here, "monovalent halide" refers to a salt compound containing an alkali metal ion and a halide ion. Examples of monovalent halides can include sodium bromide, sodium chloride, sodium iodide, potassium bromide, potassium chloride, potassium iodide, lithium bromide, lithium chloride, lithium iodide, cesium bromide, cesium chloride, cesium iodide, rubidium bromide, rubidium chloride, rubidium iodide and combinations of the same.

As used here, "primary iodide stabilizer" refers to a compound that can remove free iodine and prevent the formation of free iodine, while also reducing TCT.

As used here, "secondary iodide stabilizer" refers to a compound that can scavenge free oxygen or carbon dioxide present in a brine to prevent further oxidation of the iodide to iodine and can react with the iodine to produce iodide and stabilize the brine. Advantageously, the secondary iodide stabilizers can also stabilize the primary iodide stabilizer.

As used herein, "low molecular weight polyols" means polyols with a molecular weight of less than 1000 daltons (da).

As used herein, "true crystallization temperature" or "TCT" refers to the temperature at which crystals form in a brine for a given brine density. The true crystallization temperature is defined as the temperature corresponding to the maximum temperature reached following the super-cooling minimum. In a plot of temperature during a cooling cycle, TCT is the maximum temperature reached following the super-cooling minimum or the inflection point in cases with no super-cooling. If there is no super-cooling TCT will equal first crystal to appear (FCTA). TCT is the measured crystallization temperature nearest the temperature at which a brine will naturally crystallize in pumps, lines, filtration units, and tanks. Further described in API Recommended Practice 13J, *Testing of Heavy Brines,* 5th Ed. October 2014. By way of example, in a divalent brine containing only a divalent salt and water, as the brine density changes, the TCT changes.

As used herein, "suppress TCT" refers to a reduced TCT as compared to a brine that does not include a primary iodide stabilizer.

As used herein, "clear brine" refers to a solids-free liquid brine, where the salts are soluble and completely dissolve. Advantageously, clear brines have sufficient densities to maintain well control while minimizing potential damage to the producing zone of the well that might arise from undissolved solids.

As used here, "aqueous fluid" refers to a water-containing fluid that can be used in wellbore activities. Examples of aqueous fluid can include water, brine, water-based drilling fluids, and combinations of the same.

As used here, "brine" refers a liquid fluid containing water and soluble salts.

The stabilized divalent iodide brine can contain a divalent salt system, a primary iodide stabilizer, and aqueous fluid. In at least one embodiment, the stabilized divalent iodide brine can include a divalent salt system, a primary iodide stabilizer, an aqueous fluid, and a secondary iodide stabilizer.

The divalent salt system can include a divalent iodide alone or a divalent iodide in combination with an additional halide. In at least one embodiment, where the divalent salt system contains only a divalent iodide, the stabilized divalent iodide brine can include the divalent iodide, a primary iodide stabilizer, and an aqueous fluid. In at least one embodiment, where the divalent salt system contains a combination of a divalent iodide and an additional halide, the stabilized divalent iodide brine can include the divalent iodide, the additional halide, a primary iodide stabilizer, and an aqueous fluid. In at least one embodiment, the stabilized divalent iodide brine can include a divalent iodide, an additional halide, a primary iodide stabilizer, an aqueous fluid, and a secondary iodide stabilizer.

Examples of the primary iodide stabilizer can include low molecular weight polyols. Examples of low molecular weight polyols can include sorbitol, glycerol, xylitol, mannitol, diglycerol, polyethylene glycol with a molecular weight less than 1000 Da, and combinations of the same.

Examples of the secondary iodide stabilizer can include amines, amino alcohols, hydroxylamines, hydrazines, erythorbic acid and derivative erythorbate salts, ascorbic acid and derivative ascorbate salts, citric acid and derivative citrate salts, and combinations of the same. Examples of amines include ethylenediamine (EDA), diethylenetriamine (DETA), triethylenetetramine (TETA), tetraethylenepentamine (TEPA), pentaethylenehexamine (PEHA), aminoethylpiperazine (AEP), hexaethyleneheptamine (HEHA), piperazine, methoxypropylamine (MOPA), morpholine, n-aminopropylmorpholine (APM), and combinations of the same. Examples of amino alcohols include monoethanolamine (MEA), diethanolamine (DEA), triethanolamine (TEA), diethylaminoethanol (DEAE), dimethylethanolamine (DMEA), N-[3-aminopropyl]diethanolamine, aminoethylethanolamine (AEEA), 4-[2-hydroxyethyl]morpholine, diglycolamine, and combinations of the same. Examples of hydroxylamines include diethylhydroxylamine (DEHA), dimethylhydroxylamine (DMHA), hydroxylamine, and combinations of the same. Examples of derivative erthyorbate salts include sodium erthyorbate. Examples of derivative ascorbate salts include sodium ascorbate, potassium ascorbate, magnesium ascorbate, calcium ascorbate and combinations of the same. Examples of derivative citrate salts include mono-, di-, and tri-sodium citrate, potassium citrate, magnesium citrate, calcium citrate, and combinations of the same. In at least one embodiment, the secondary iodide stabilizer is MEA. In at least one embodiment, the secondary iodide stabilizer can include MEA, AEEA, DEHA, and combinations of the same.

In an embodiment of the stabilized divalent iodide brine, where the divalent salt system contains only a divalent iodide, the divalent iodide can be present in the range between 1 percent by weight (wt %) and 70 wt % of the stabilized divalent iodide brine and alternately between 5 wt % and 65 wt % of the stabilized divalent iodide brine. In an embodiment of the stabilized divalent iodide brine, where the divalent salt system contains only a divalent iodide, the primary iodide stabilizer can be present in the range between 0.1 wt % and 35 wt % of the stabilized divalent iodide brine, alternately between 1 wt % and 30 wt % of the stabilized divalent iodide brine, and alternately between 2 wt % and 25 wt % of the stabilized divalent iodide brine. In an embodiment of the stabilized divalent iodide brine, where the divalent salt system contains only a divalent iodide, the secondary iodide stabilizer can be present in an amount between 0.001 volume per volume percent (v/v %) and 5 v/v %.

In an embodiment of the stabilized divalent iodide brine, where the divalent salt system contains both a divalent iodide and an additional halide, the divalent iodide can be present in the range between 1 wt % and 70 wt % of the stabilized divalent iodide brine. In an embodiment of the stabilized divalent iodide brine, where the divalent salt system contains both a divalent iodide and an additional halide, the additional halide can be present in the range between 1 wt % and 45 wt % of the stabilized divalent iodide brine. In an embodiment of the stabilized divalent iodide brine, where the divalent salt system contains both a divalent iodide and a divalent halide, the primary iodide stabilizer can be present in the range between 0.1 wt % and 35 wt %. In an embodiment of the stabilized divalent iodide brine, where the divalent salt system contains both a divalent iodide and a divalent halide, the secondary iodide stabilizer can be present in an amount between 0.001 volume per volume percent (v/v %) and 5 v/v %.

The stabilized divalent iodide brine is an aqueous mixture, such that the remainder of the stabilized divalent iodide brine includes the aqueous fluid. In at least one embodiment, the aqueous fluid is water. In at least one embodiment, the aqueous fluid is brine.

The density of the stabilized divalent iodide brine can be at least 11 lb/gal, and alternately between 11 lb/gal and 17.5 lb/gal, and alternately between 14.2 lb/gal and 17.5 lb/gal.

The TCT of the stabilized divalent iodide brine can be less than or equal to 70 degrees Fahrenheit (deg F.).

The stabilized divalent iodide brine can be prepared by mixing the divalent salt system and the aqueous fluid in amounts to achieve the desired density. In a second step the primary iodide stabilizer can be mixed. In at least one embodiment, additional additives are added in a third step. The stabilized divalent iodide brine can be prepared at the wellsite or can be prepared offsite from the wellsite and delivered premade to the wellsite. In at least one embodiment, when the stabilized divalent iodide brine is prepared at the wellsite, additional amounts of the components can be added after the initial preparation of the stabilized monovalent iodide brine. In at least one embodiment, when the stabilized divalent iodide brine is prepared offsite from the wellsite additional amounts of the components can be added after being delivered to the wellsite to adjust the properties as necessary.

The stabilized divalent iodide brines described here can be used in any wellbore activity during the drilling and completion phases of an oil and gas producing well that requires a brine-based fluid. Wellbore activities can include drilling, reservoir drilling, completion activities, workover activities, well intervention activities, and as a packer fluid.

The stabilized divalent iodide brine is in the absence of zinc compounds, including zinc bromide ($ZnBr_2$), such that the stabilized divalent iodide brine does not contain zinc compounds. The stabilized divalent iodide brine is in the absence of cesium formate, such that the stabilized divalent iodide brine does not contain cesium formate. The stabilized divalent iodide brine is in the absence of earth nitrate salts, such that the stabilized divalent iodide brine does not contain earth nitrate salts.

Examples

For each of the examples, samples were developed based on a matrix approach targeting density and TCT. In the matrix approach, a test matrix was developed based on varying the amount of the divalent iodide salt used and the properties were measured. A larger matrix was then conducted and the samples were formulated from this larger matrix to meet predetermined specifications.

Example 1. Example 1 analyzed the properties of brines with a divalent salt system containing calcium bromide and calcium iodide. Measurements of density, TCT, and pH were taken before the stability testing. Sample 1 was a comparison sample containing only calcium bromide. The stability test was performed by allowing the samples to stand at room temperature (70 deg F. (21 deg C.)) for two months. As used in Table 1, "pH, neat" refers to the pH of the undiluted brine being measured in the absence of any additives.

TABLE 1

Properties of divalent iodide/bromide brines

|  | Wt % $CaI_2$ | Wt % $CaBr_2$ | Wt % Water | Density (lb/gal) | TCT (° F.) | pH, neat | Initial Color | Color after stability test |
|---|---|---|---|---|---|---|---|---|
| Sample 1 | 0 | 53.1 | 46.9 | 14.2 | 10 | 6.5 | colorless | colorless |
| Sample 2 | 8 | 52 | 40 | 14.43 | −35 | 7.46 | Orange | Black with ppt |
| Sample 3 | 16 | 42 | 42 | 14.62 | −53 | 7.74 | Orange | Black with ppt |
| Sample 4 | 6 | 57.3 | 36.7 | 15.8 | 72.6 | 5.86 | Orange | Black with ppt |
| Sample 5 | 7 | 48.4 | 44.6 | 15.9 | 73.6 | 4.76 | Orange | Black with ppt |
| Sample 6 | 20 | 39.8 | 40.2 | 16.04 | 52.4 | 5.7 | Orange | Black with ppt |

The data in Table 1 demonstrate that the use of a divalent salt system in a brine that includes both calcium iodide and calcium bromide results in an increased brine density and lower TCT than a brine containing only calcium bromide. The transition in color of samples 2 through 6 suggests that the iodide was oxidized to form $I_2$. As a result of the oxidation, samples 2-6 contain calcium iodide, calcium bromide, and $I_2$.

Example 2. Example 2 assessed the properties of brines with a divalent salt system containing calcium iodide. Measurements of density, TCT, and pH were taken before the stability testing. The stability test was performed by allowing the samples to stand at room temperature (70 deg F. (21 deg C.)) for two months.

TABLE 2

Properties of divalent iodide brines

|  | Wt % $CaI_2$ | Wt % Water | Density (lb/gal) | TCT (° F.) | Initial Color | Color after stability test |
|---|---|---|---|---|---|---|
| Sample 1 | 61.5 | 38.4 | 17.49 | 65 | Orange | Black with ppt |
| Sample 2 | 57.1 | 42.9 | 16.53 | −15.6 | Orange | Black with ppt |
| Sample 3 | 53.3 | 46.1 | 15.56 | <−50* | Orange | Black with ppt |
| Sample 4 | 50 | 50 | 14.86 | <−50 | Orange | Black with ppt |

*<−means less than or equal to

As shown in Table 2, the use of a divalent salt system in a brine that includes only calcium iodide can produce high density brines with low TCT values. The transition in color of the samples demonstrate that the iodide was oxidized to form $I_2$. As a result of the oxidation, the samples contain calcium iodide and $I_2$.

Example 3. Example 3 compared stabilized divalent iodide brines to brines containing only calcium bromide and glycerol. The primary iodide stabilizer in Example 3 was glycerol. Measurements of density, TCT, and pH were taken before the stability testing. The stability test was performed by allowing the samples to stand at room temperature (70 deg F. (21 deg C.)) for two months.

TABLE 3

Comparison of stabilized divalent iodide brines to calcium bromide brines

|  | Wt % $CaI_2$ | Wt % $CaBr_2$ | Wt % Water | Wt % Glycerol | Density (lb/gal) | TCT (° F.) | Initial Color | Color after stability test |
|---|---|---|---|---|---|---|---|---|
| Sample 1 | 4.2 | 47.1 | 38.7 | 10 | 14.58 | −2.7 | colorless | colorless |
| Sample 2 | — | 52.7 | 37.3 | 10 | 14.6 | 5 | colorless | colorless |
| Sample 3 | 16.1 | 44.3 | 32.9 | 6.7 | 14.76 | <−50 | colorless | colorless |
| Sample 4 | — | 53.9 | 39.1 | 7 | 14.8 | 28 | colorless | colorless |
| Sample 5 | 19 | 38.0 | 38.3 | 4.7 | 15.66 | 34.2 | colorless | colorless |
| Sample 6 | 6.6 | 48.1 | 36.1 | 9.2 | 15.16 | 34.6 | colorless | colorless |
| Sample 7 | — | 55.7 | 35.3 | 9 | 15.2 | 50 | colorless | colorless |
| Sample 8 | 5.4 | 52.2 | 33.4 | 9 | 15.02 | 27.8 | colorless | colorless |
| Sample 9 | — | 54.5 | 36.5 | 9 | 15.0 | 39.5 | colorless | colorless |

The data in Table 3 reveal that stabilized divalent iodide brines have increased densities, reduced TCT, and stabilization of the divalent iodide ions. The addition of glycerol to the divalent iodide brines reduced or prevented the oxidation of the iodide ions to produce $I_2$, as can be seen because the samples were colorless at both the initial time and after the stability test. Comparing sample 1 to sample 2, Sample 3 to Sample 4, Sample 6 to Sample 7, and Sample 8 to Sample 9 shows divalent brines with similar density, but the samples containing calcium iodide have reduced TCT as compared to the samples containing only calcium bromide. Sample 5 illustrates the ability to achieve greater densities than brines containing only calcium bromide while still possessing a TCT that is acceptable for process conditions.

Example 4. Example 4 assessed the use of sorbitol as a primary iodide stabilizer. Measurements of density, TCT, and pH were taken before and after the stability testing. The stability test was performed by allowing the samples to stand at room temperature (70 deg F. (21 deg C.)) for two months.

TABLE 4

Properties of divalent iodide brines

|  | Wt % $CaI_2$ | Wt % Water | Wt % Sorbitol | Density (lb/gal) | TCT (° F.) | Initial Color | Color after stability test |
|---|---|---|---|---|---|---|---|
| Sample 1 | 57.1 | 42.9 | 0 | 16.53 | −15.6 | Orange | Black ppt |
| Sample 2 | 53 | 40 | 7 | 16.32 | <−50 | colorless | Clear pale orange |
| Sample 3 | 55.1 | 41.4 | 3.5 | 16.33 | <−50 | colorless | Clear pale orange |

The data in Table 4 show that sorbitol can stabilize divalent iodide ions.

Example 5. Example 5 tested the stability of divalent iodide brines at elevated temperatures. In Table 5, Sample 1 was a stabilized divalent iodide brine containing 37.9 wt % $CaBr_2$, 19 wt % $CaI_2$, 38.3 wt % water, 4.7 wt % glycerol, and 0.30% v/v MEA. In Table 6, Sample 2 was a stabilized divalent iodide brine containing 46.7 wt % $CaI_2$, 29.3 wt % water, 24 wt % glycerol, and 0.30% v/v MEA. In Table 6, Sample 3 was a stabilized divalent brine containing 46.7 wt % $CaI_2$, 29.3 wt % water, and 24 wt % glycerol. To test thermal stability, each sample was aged at 275 deg F. for 7 days in a high pressure thermal aging cells pressurized with 300 psi nitrogen gas.

TABLE 5

Thermal Stability of Sample 1 at 275° deg F. for 7 days.

| Color before aging | Pale straw color |
|---|---|
| Color after aging 1 week @ 275° deg F. | Straw color, slightly darker |
| pH after 1 week @ 275° deg F. | 6.79 |
| TCT before aging | 34.2° deg F. |
| TCT after aging | 31.2° deg F. |

TABLE 6

Thermal Stability of Samples 2 and 3 at 275° deg F. for 7 days.

|  | Sample 2 | Sample 3 |
|---|---|---|
| Secondary iodide stabilizer | MEA 0.30% v/v | None |
| Color before aging | Pale straw color | Pale straw color |
| Color after aging 1 week @ 275° deg F. | colorless | colorless |
| pH before aging | 8.04 | 7.78 |
| pH after 1 week @ 275° deg F. | 7.73 | 6.85 |

The results in Table 5 show that there is little impact on the TCT of the sample after exposure to elevated temperatures. This suggests that stabilized divalent iodide brines can be exposed to an elevated bottom hole temperature statically for extended periods of time without detriment to the performance of the stabilized divalent iodide brine. The results in Table 6 show that the components of the fluid do not decompose when exposed to elevated temperatures. Table 6 also illustrates that the addition of MEA assists in maintaining a greater pH and a smaller drop in pH during the aging process. This suggests that the addition of MEA to a stabilized divalent iodide brine enhances corrosion protection and stability.

Although the present embodiments have been described in detail, it should be understood that various changes, substitutions, and alterations can be made hereupon without departing from the principle and scope. Accordingly, the scope should be determined by the following claims and their appropriate legal equivalents.

The singular forms "a," "an," and "the" include plural referents, unless the context clearly dictates otherwise.

Optional or optionally means that the subsequently described event or circumstances can or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

As used herein and in the appended claims, the words "comprise," "has," and "include" and all grammatical variations of the same are each intended to have an open, non-limiting meaning that does not exclude additional elements or steps.

It is to be understood that that the mere use of the term "primary" and "secondary" does not require that there be any "tertiary" or "third" component, although that possibility is contemplated under the scope of the embodiments.

What is claimed is:

1. A method of using a stabilized divalent iodide brine during a wellbore activity, the method comprising the steps of:
   introducing the stabilized divalent iodide brine into a wellbore, the stabilized divalent iodide brine comprising:
      a divalent salt system, where the divalent salt system comprises a divalent iodide present in an amount between 1 wt % and 70 wt %, wherein the divalent iodide is selected from the group consisting of calcium iodide, magnesium iodide, strontium iodide, and combinations of the same;
      a primary iodide stabilizer, the primary iodide stabilizer operable to remove free iodine and prevent the formation of free iodine, wherein the primary iodide stabilizer comprises a low molecular weight polyol selected from the group consisting of sorbitol, glycerol, xylitol, mannitol, diglycerol, polyethylene glycol with a molecular weight less than 1000 Da, and combinations of the same;
      a secondary iodide stabilizer, the secondary iodide stabilizer operable to scavenge free oxygen or carbon dioxide and prevent oxidation of the iodide to iodine, the secondary iodide stabilizer selected from the group consisting of amines, amino alcohols, hydroxylamines, hydrazines, erythorbic acid and derivative erythorbate salts, ascorbic acid and derivative ascorbate salts, citric acid and derivative citrate salts, and combinations of the same;
      an aqueous fluid;
   completing the wellbore activity.

2. The method of claim 1, wherein the wellbore activity is selected from the group consisting of drilling, reservoir drilling, completion activities, workover activities, well intervention activities, and activities using a packer fluid.

3. The method of claim 1, wherein the divalent salt system further comprises an additional halide.

4. The method of claim 1, wherein the primary iodide stabilizer is present in the range between 0.1 wt % and 35 wt % of the stabilized iodide brine.

5. The method of claim 4, wherein the additional halide is selected from the group consisting of a divalent halide, a monovalent halide, and combinations of the same.

6. The method of claim 4, wherein the additional halide comprises a divalent halide selected from the group consisting of calcium bromide, calcium chloride, magnesium bromide, magnesium chloride, strontium bromide, strontium chloride, and combinations of the same.

7. The method of claim 4, wherein the additional halide comprises a monovalent halide selected from the group consisting of sodium bromide, sodium chloride, sodium iodide, potassium bromide, potassium chloride, potassium iodide, lithium bromide, lithium chloride, lithium iodide, cesium bromide, cesium chloride, cesium iodide, rubidium bromide, rubidium chloride, rubidium iodide and combinations of the same.

8. The method of claim 4, wherein the divalent iodide is present in the range between 1 wt % and 70 wt % of the stabilized divalent iodide brine, and further wherein the additional halide is present in the range between 1 wt % and 45 wt %, and further wherein the primary iodide stabilizer is present in the range between 0.1 wt % and 35 wt % of the stabilized divalent iodide brine.

9. The method of claim 1, wherein the secondary iodide stabilizer is present in the range between 0.001% v/v and 5% v/v.

10. The method of claim 1, where the secondary iodide stabilizer comprises an amine selected from the group consisting of ethylenediamine (EDA), diethylenetriamine (DETA), triethylenetetramine (TETA), tetraethylenepentamine (TEPA), pentaethylenehexamine (PEHA), aminoethylpiperazine (AEP), hex aethyleneheptamine (HEHA), piperazine, methoxypropylamine (MOPA), morpholine, n-aminopropylmorpholine (APM), and combinations of the same.

11. The method of claim 1, where the secondary iodide stabilizer comprises an amino alcohol selected from the group consisting of monoethanolamine (MEA), diethanolamine (DEA), triethanolamine (TEA), diethylaminoethanol (DEAE), dimethylethanolamine (DMEA), N-[3-aminopropyl]diethanolamine, aminoethylethanolamine (AEEA), 4-[2-hydroxyethyl]morpholine, diglycolamine, and combinations of the same.

12. The method of claim 1, where the secondary iodide stabilizer comprises an hydroxylamine selected from the group consisting of diethylhydroxylamine (DEHA), dimethylhydroxylamine (DMHA), hydroxylamine, and combinations of the same.

13. The method of claim 1, where the secondary iodide stabilizer comprises sodium erthyorbate.

14. The method of claim 1, where the secondary iodide stabilizer comprises a derivative ascorbate salt selected from the group consisting of sodium ascorbate, potassium ascorbate, magnesium ascorbate, calcium ascorbate and combinations of the same.

15. The method of claim 1, where the secondary iodide stabilizer comprises a derivative citrate salt selected from the group consisting of mono-, di-, and tri-sodium citrate, potassium citrate, magnesium citrate, calcium citrate, and combinations of the same.

16. The method of claim 1, where the secondary iodide stabilizer is selected form the group consisting of monoethanolamine (MEA), aminoethylethanolamine (AEEA), diethylhydroxylamine (DEHA), and combinations of the same.

17. A method of creating a stabilized divalent iodide brine, the method comprising the steps of:
  adding an amount of a divalent salt system to an aqueous fluid, where the divalent salt system comprises a divalent iodide present in an amount between 1 wt % and 70 wt %, wherein the divalent iodide is selected from the group consisting of calcium iodide, magnesium iodide, strontium iodide, and combinations of the same;
  adding an amount of a primary iodide stabilizer, the primary iodide stabilizer operable to remove free iodine and prevent the formation of free iodine, wherein the primary iodide stabilizer comprises a low molecular weight polyol selected from the group consisting of sorbitol, glycerol, xylitol, mannitol, diglycerol, polyethylene glycol with a molecular weight less than 1000 Da, and combinations of the same; and
  adding a secondary iodide stabilizer, the secondary iodide stabilizer operable to scavenge free oxygen or carbon dioxide and prevent oxidation of the iodide to iodine, the secondary iodide stabilizer selected from the group consisting of amines, amino alcohols, hydroxylamines, hydrazines, erythorbic acid and derivative erythorbate salts, ascorbic acid and derivative ascorbate salts, citric acid and derivative citrate salts, and combinations of the same.

18. The method of claim 17, further comprising the step of adding an additional halide.

19. The method of claim 17, wherein the primary iodide stabilizer is present in the range between 0.1 wt % and 35 wt % of the stabilized iodide brine.

20. The method of claim 17, wherein the secondary iodide stabilizer is present in the range between 0.001% v/v and 5% v/v.

* * * * *